Aug. 22, 1967   J. N. MORRIS   3,336,912
FUEL INJECTION CONTROL SYSTEM
Filed March 24, 1965   2 Sheets-Sheet 1

INVENTOR.
BY JOHN NEVILLE MORRIS
Edwin E. Greigg

INVENTOR.
BY JOHN NEVILLE MORRIS

United States Patent Office 3,336,912
Patented Aug. 22, 1967

3,336,912
FUEL INJECTION CONTROL SYSTEM
John N. Morris, Birmingham, England, assignor of one-half to The S.U. Carburetter Co. Ltd., Birmingham, England, a British company, and one-half to Simmonds Precision Products, Inc., Tarrytown, N.Y., a corporation of New York
Filed Mar. 24, 1965, Ser. No. 442,344
3 Claims. (Cl. 123—140)

ABSTRACT OF THE DISCLOSURE

The invention relates to an apparatus for controlling the fuel/air ratio of a combustible mixture in a spark-ignition internal combustion engine, served by a positive displacement variable-stroke liquid-fuel-injection pump that is driven by an engine at a constant speed-ratio. Included in the assembly of the apparatus is a positive displacement fixed-stroke liquid-pump driven by the engine, engine-speed sensing means, a three-dimensional cam movable, in paths at right angles to each other, by the engine-speed sensing means and by a linkage that actuates the main air throttle valve of the engine respectively. A cam-follower is controlled by the cam and effective to apply variable loading to a means which is sensitive to barometric pressure and to engine air-intake temperature, a liquid-powered servo mechanism receiving the output of the liquid-pump and coupled to the pressure/temperature-sensitive means. Also included in the apparatus are a regulating means operable by the servo mechanism to control the fuel-per-cycle delivery of the fuel-injection pump, and modulating means effective, in response to a given change of air-intake temperature or of barometric pressure, to modulate that delivery to an extent proportional to its value, i.e. by a constant percentage.

---

This invention relates to means for controlling the fuel/air ratio of the combustible mixture in liquid-fuel-injection, spark-ignition internal combustion engines. Moreover, the invention is particularly, although not exclusively, applicable to a fuel-injection pump which is arranged to supply fuel sequentially to a plurality of nozzles situated individually in the respective induction passages or inlet ports of a multi-cylinder, spark-ignition engine.

In one known system of controlling the output of a fuel-injection pump, which is commonly known as the speed-density system, the pump is operated at a speed proportional to that of the engine; and the major influence in determining its output per revolution is derived from the mean absolute pressure obtaining in the induction manifold of the engine, additional minor influences to accommodate variations in air intake temperature and barometric pressure being generally superimposed upon the major influence. This system, clearly, is only valid so long as the quantity of air induced by the engine per cycle may correctly be regarded as being simply proportional to the mean absolute pressure prevailing in the induction manifold. It is, however, subject to serious errors in the case of an engine having wide overlap characteristics in the valve timing, or pronounced induction-pipe ramming effects, or operating at very high speeds (when the quantity of air induced per cycle by the engine falls off markedly due to air-flow restriction imposed by the inlet ports and valves). Under any or all of such conditions, the air induced per cycle of the engine throughout its operating range, ceases to be even approximately proportional to the mean absolute pressure obtaining in the induction manifold.

A further disability of the speed-density system arises when the engine is operated under "over-run" conditions. For example, in the case of an engine installed in a motor vehicle, the engine may be driven by the vehicle, when descending a hill or during deceleration, at a speed greatly in excess of that at which it would run, when completely unloaded, for the same degree of throttle opening. Under such an over-run condition the manifold depression is not appreciably greater than under the unloaded condition, and hence the quantity of fuel per cycle delivered by the injection pump is not appreciably diminished. The quantity of air consumed by the engine per unit of time is, again, not appreciably different under the two conditions envisaged and, therefore, the quantity of air consumed by the engine per cycle during the overrun condition, is substantially less than that which obtains in the unloaded condition. It follows that, during over-run operation, the fuel/air ratio will be drastically increased, with serious consequences in the matter of fuel economy and atmospheric pollution.

In an alternative known system of controlling the output of a fuel-injection pump, the latter, is, again, operated at a speed proportional to that of the engine, but the major influence in determining its output per cycle is no longer derived from the manifold pressure, but from the relationship existing between the engine speed and the degree of opening of the main air throttle. This system incorporates a three-dimensional cam which is displaceable in one direction, as a function of engine speed, by a movable speed-sensitive element; and, in a direction at right angles to the first, as a function of the degree of throttle opening. A movable finger, which bears upon the surface of the three-dimensional cam, directly controls the stroke of the pump, or otherwise directly determines its output per cycle. As in the case of the speed-density system, the additional minor influences of air-intake temperature and barometric pressure may be superimposed upon the major influence.

It will be appreciated that in the case of the system last described, no assumptions are made, so far as the major metering influence is concerned, as to the amount of air per cycle, and, hence, fuel per cycle, the engine should require at any particular combination of speed and load. But the fuel-per-cycle requirement can be arrived at purely by test observations, which may conveniently by conducted with a dynamometer; the full range of fuel-per-cycle requirement including all over-run phases of operation. In this way the complete form of the three-dimensional cam can be determined from operation of the engine over its entire speed-load range. With this control system, therefore, the major limitations of the speed-density system are not encountered. In fact, any given point on the surface of the cam, being in coincidence with the movable finger, corresponds, so far as the major metering influence is concerned, to a unique combination of engine speed and load.

In accordance with the invention means for controlling the fuel/air ratio of the combustible mixture in a spark-ignition internal combustion engine, served by a positive displacement variable-stroke liquid-fuel-injection pump that is driven by the engine at a constant speed-ratio, comprises, in combination, a positive displacement fixed-stroke liquid-pump driven by the engine, engine-speed sensing means, a three-dimensional cam movable, in paths at right angles to each other, by the engine-speed sensing means and by a linkage that actuates the main air throttle valve of the engine respectively, a cam-follower controlled by the cam and effective to apply variable loading to means sensitive to barometric pressure and to engine air-intake temperature, a liquid-powered servo mechanism receiving the output of the liquid-pump and coupled to the pressure/temperature-sensitive means, regulating means operable by the servo mechanism to control the fuel-per-cycle delivery of the fuel-injection pump, and modulating means effective, in response to a given change of air-intake temperature or of barometric pressure, to modulate that delivery to an extent proportional to its value, i.e. by a constant percentage.

The invention will be better understood after reading the following description in connection with the accompanying drawings in which.

Figure 1:
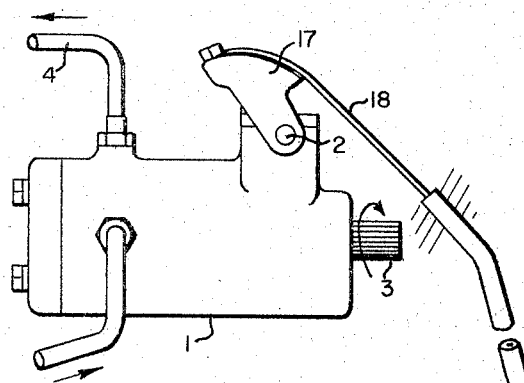
FIGURE 1 depicts the control system when the engine is operating at full load and low speed.
Figure 3:
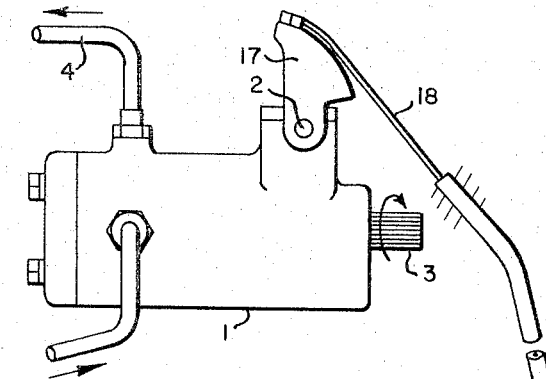
FIGURE 3 depicts the control system with the engine is idling.

Referring now to FIGURES 1 and 3, a fuel-injection pump 1 of the positive displacement type has its output of fuel per revolution of the pump, and, therefore, per engine cycle, directly regulated by partial rotation of a spindle 2. The pump is arranged to be driven at some constant fraction of engine speed by means of a shaft 3, and its output of fuel, which may be delivered by a single outlet duct or by a multiplicity of outlet ducts, emerges via a delivery pipe 4 or a plurality of such pipes.

The control means, which is the subject of the invention, comprises inter alia a liquid-powered servo mechanism having a casing 5 formed with a bore in which is situated an axially slidable piston 6. The casing 5 has an inlet duct 7 of relatively large bore, which is supplied with unmetered pressurized fluid from an engine-driven pump (not shown) which may be either separate from, or integral with, the injection pump 1; and a spill orifice 8 of relatively small bore which discharges into a fluid reservoir from which the pressurized fluid supplied to the duct 7 is drawn. The fluid in question is preferably the fuel which is also handled by the injection pump 1.

As depicted, the piston 6 is constantly urged to the left by means of a compression spring 9 which reacts upon a valve plate 10. This is capable of closure on to a seating associated with an orifice 11 at the end of a hollow central rod 12 upon which the piston 6 is slidably mounted.

Assuming the servo mechanism to be in the condition depicted in FIGURE 1, a sufficient axial load applied to a slidably-mounted push-pin 13 which abuts against, or is integral with, the valve plate 10, will cause a complete closure of the orifice 11. Pressurized fluid entering by the duct 7 will now cause the piston 6 to move to the right, fluid on the right-hand side thereof escaping through the orifice 8 until the spring 9 is sufficiently compressed to exert a load upon the valve plate 10 such as to overcome the axial load exerted by the push-pin 13. Thereupon fluid, freely entering through the duct 7 and past the now uncovered orifice 11 will, due to the flow restriction afforded by the orifice 8, build up a sufficient pressure on the right-hand side of the piston 6 to prevent further movement thereof to the right. It will be understood that, since the spring 9 is of substantially constant rate, the piston 6 will always assume a stable position which is in simple linear relationship to the magnitude of the axial load exerted by the push-pin 13.

A groove or slot 14 is provided in an extension of the piston 6, and a variable velocity-ratio mechanical connection is provided as between movement of this piston and rotation of the spindle 2, partial rotation of which, in turn, determines the output per revolution of the injection pump 1. This variable velocity ratio may conveniently be provided by the employment of two eccentric sectors 16 and 17 rotatably mounted on spindles 15 and 2, of the control unit and injection pump respectively, and interconnected by a flexible push-pull cable 18. An extension of the sector 16, which is rotatably mounted upon a fixed pivot-pin 15, carries a pin 19 which engages the groove or slot 14. The arrangement is such that as between the position assumed by the parts concerned which corresponds to the condition of full load or maximum fuel-per-cycle delivery (FIG. 1), and that which corresponds to the condition of idling or minimum fuel-per-cycle delivery (FIG. 3); the velocity-ratio as between rotation of the spindle 2 and, therefore, the fuel-per-cycle delivery, and movement of the piston 6 is approximately in the ratio of 5 to 1; that is to say, approximately in the ratio of the quantity of fuel per cycle demanded by the engine under these extremes of operating condition.

Considering now the factors which contribute to the load exerted by the push-pin 13, these comprise a load $L_1$, which may conveniently be tensile, exerted by a spring 20 and dependent upon the displacement of a contacting finger 22 by the surface of a three-dimension cam 23 operative through a bell-crank lever 21 which is rotatably mounted upon a fixed pivot 24; and the combined loads $L_2$ exerted by a group of sealed capsules 27 (conveniently two in number) which are externally exposed to atmospheric pressure, and which may conveniently have internal compression springs 25. These capsules contain dry gas at an absolute pressure commensurate with the degree of temperature correction required. Both the tensile load $L_1$ of the spring 20 and the combined compressive loads $L_2$ of the capsules 27 fall upon a pressure-plate 26 which abuts the push-pin 13. That section of the housing containing the capsules 27 is arranged to sense engine coolant temperature, provision for which is afforded by a coolant circulation jacket 28. The resultant of the loads $L_1$ and $L_2$ is such that for all possible positions, both longitudinal and rotational, of the three-dimensional cam 23, and for all possible combinations of loading exerted by the capsules 27, there is always a residual compressive force acting upon the push-pin 13.

Figure 2:
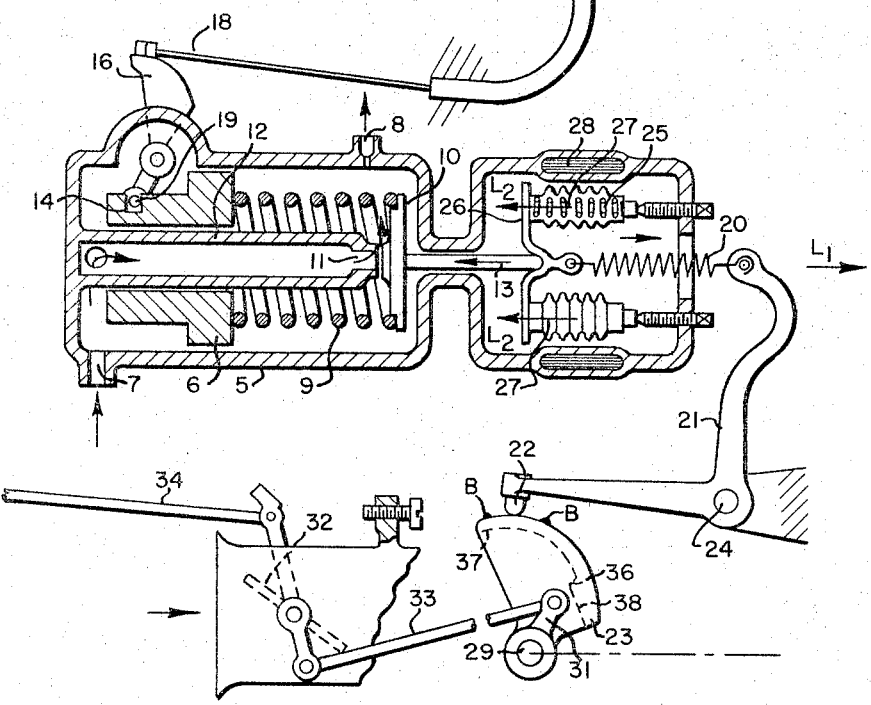
FIGURE 2 shows another view of a sub-assembly of FIGURE 1, together with an associated engine-speed sensing device.
Figure 2:
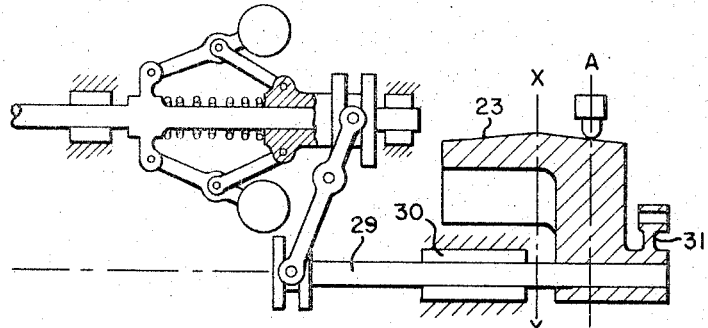
Figure 4:
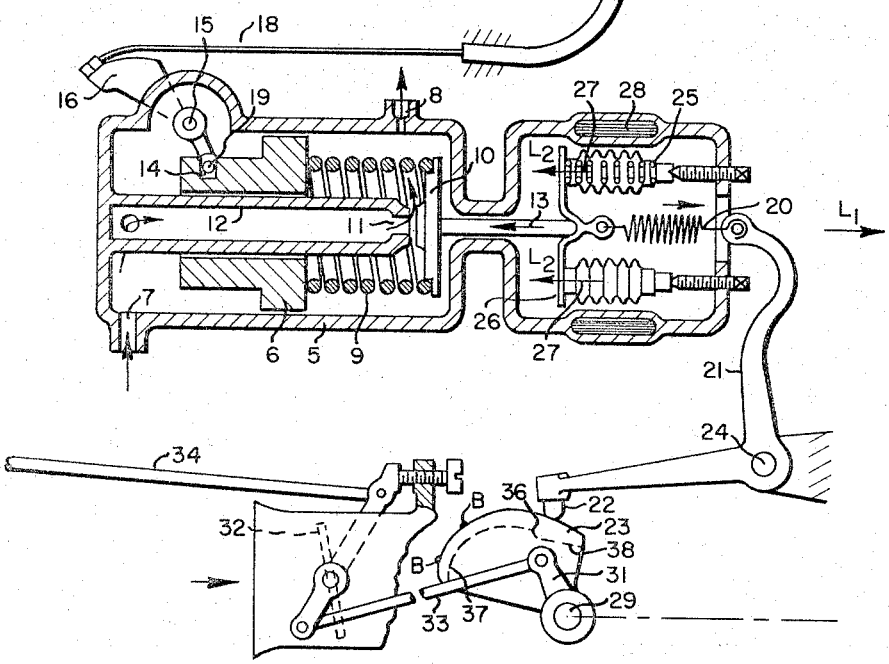
FIGURE 4 is a view similar to FIGURE 2 but corresponding to the conditions represented by FIGURE 3.
Figure 4:
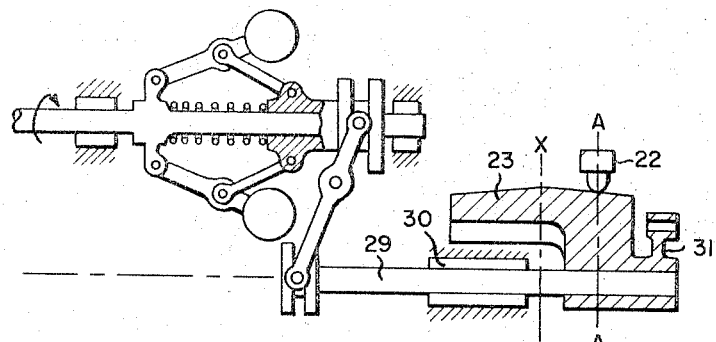

The three-dimensional cam 23 is attached to a spindle 29 which is both longitudinally and rotationally mounted within a fixed bush 30 (FIGS. 2 and 4). Rotational movement of the cam is effected by a lever 31 which is mechanically connected, via a rod 33, both to the main engine air throttle 32 and, by means of a rod 34, to the vehicle's accelerator pedal; while longitudinal movement is imparted to the cam 23 by means of any form of engine-speed sensing device. As shown, such device may consist of a classical spring-returned steam-engine governor 35, driven at some convenient ratio of engine speed, its geometry and return-spring arrangement being preferably such as to cause axial movement of the cam spindle 29 which is in linear relationship to engine speed.

In order to appreciate how the control system functions, it is only necessary to consider the action at one particular engine speed; that is to say, when one particular cross-section of the three-dimensional cam 23 is in operation. Thus, for a constant engine speed of, for instance, 500 r.p.m., one unique cross-section of the three-dimensional cam, such as represented by the line A—A (FIGS. 2 and 4), will be operative. It will be clear that, in the absence of any variation in the temperature and ambient pressure active upon the capsules 27, the loads $L_2$ imposed by them will remain constant and that, under these conditions, a contour of the cross-section A—A of the cam 23 operative at this particular speed, can be determined such that the load $L_1$ exerted by the spring 20 for any rotational position of the cam 23 will cause a corresponding load to be exerted by the spring 9, and hence a corresponding longitudinal position to be assumed by the piston 6. Such longitudinal position becomes stabilized when the load exerted by the spring 9 equals that applied to the push-pin 13 by the combination of loads active upon the pressure-plate 26, the resultant balance of forces permitting the valve plate 10 to recede to such a distance from its seating at 11 that the fluid-pressure difference across the piston 6 is just sufficient to balance the load exerted by the spring 9. Whatever the variation in velocity-ratio as between movement of the piston 6 and partial rotation of the spindle 2, it is the extent of the rotational movement of this spindle that determines the quantity of fuel per cycle delivered by the injection pump.

A contour of the cross-section A—A of the three-dimensional cam 23, which, as will be recalled, is exclusively in operation at the contemplating engine speed of 500 r.p.m., can be so chosen that the air/fuel ratio delivered to the engine either remains constant or, if preferred, varies between about 12/1 at idling, progressing to about 15/1 at part-load conditions and finally attaining a value of about 13/1 when the engine air throttle 32 is effectively fully open. It will be noted that, at this relatively low engine speed, the last-mentioned condition occurs when the throttle is opened to a relatively small angle from the idling setting; further opening of the throttle from this position producing negligible increase in air-flow to the engine. Therefore, negligible increase in the output of the fuel pump per cycle is required, and consequently that zone B—B (FIGS. 1 and 3), of the cam 23 that is involved in such further opening is of substantially accurate form.

The effect of a change in barometric pressure will now be explained. Since the capsules 27 are externally exposed to atmosphere, a drop of 1 p.s.i. (for example) in barometric pressure will cause an increase of the resultant of the loads on the push-pin 13 equal 1 p.s.i. multiplied by the total cross-sectional area of the capsules.

When the pump is operating at full load, namely, with the piston 6 in the position depicted in FIGURE 1, the effect of the assumed change in barometric pressure will be to increase the load on the push-pin 13 by amount of 1 p.s.i. multiplied by the sum total of the cross-sectional areas of the capsules 27.

If the same assumed diminution of atmospheric pressure occurs when the pump is operating at idling conditions, depicted in FIGURE 3, the resultant increase in load on the push-pin 13 will be identical to that obtaining under full-load conditions and, since the spring 9 is of substantially constant rate, will give rise to exactly the same axial displacement of the piston 6 as when this was in the position corresponding to maximum fuel-per-cycle output.

Since the fuel-per-cycle requirement of a typical spark-ignition petrol engine under idling conditions is approximately one-fifth of that under full-load conditions, it will be appreciated that the effective velocity-ratio of the piston 6 with respect to the fuel-per-cycle control member 2 (rotation of which is assumed to be simply proportional to the injection pump output per cycle) must be caused to vary to this degree as between full-load and idle conditions. The manner in which this requirement is met in the case of the illustrated embodiment of the invention has already been described.

Any variation in air intake temperature, as assumed to be reflected in the temperature of the engine coolant jacket 28 surrounding the capsules 27, will similarly call for a change in the fuel per cycle supplied by the injection pump closely analogous to the change required by variation in atmospheric pressure. This may be achieved by an appropriate degree of gas-filling of the capsules 27.

In an alternative method of carrying the invention into effect, the velocity-ratio as between movement of the piston 6 and the fuel-per-cycle control spindle 2 remains substantially constant, and the spring 9 is designed to have a progressively increasing rate. In accordance with this implementation of the invention, the rate of the spring 9 under idling conditions, as depicted in FIGURE 3, will require to have risen to approximately five times the value obtaining under the full-load condition, as shown in FIGURE 1.

Although only one constant engine speed (that corresponding to the particular cross-section A—A of the three-dimensional cam 23) has so far been considered, it will be appriciated than an appropriate cam cross-section, such as X—X (FIGS. 2 and 4) can be derived from any other engine speed. In the case of any cam cross-section in operation at the higher engine speeds, a sudden fall-away in the cam contour is so located that the contacting finger 22 is caused to assume a position such that fuel delivery is completely suppressed upon the occurrence of an over-run condition sufficiently pronounced to engender misfiring of the engine due to attenuation of the charge, namely, whenever closing of the engine throttle to a given angle coincides with the engine-speed being considerably higher than the free engine idling speed which would correspond to that given throttle angle. Such a fall-away is indicated at 36 in the contour 37, 38 (FIGS. 1 and 3) of the three-dimensional cam 23, assumed to correspond to the line X—X in FIGURES 2 and 4. Under actual operating conditions, the cam 23 will, of course, be subject to constant changes both rotationally, in response to accelerator pedal position, and longitudinally, in response to variations in engine speed.

Since changes could be made both in the illustrated embodiments of the invention and the above description, and different words of description could be used without departing from the scope and spirit of the invention, it is to be understood that the invention is limited solely by the appended claims.

What I claim is:

1. Means for controlling the fuel/air ratio of the combustible mixture in a spark-ignition internal combustion engine, served by a positive displacement variable-stroke liquid-fuel-injection pump that is driven by the engine at a constant speed-ratio, comprising:
   a positive displacement fixed-stroke liquid pump driven by the engine,
   engine-speed sensing means,
   a three-dimensional cam movable in paths at right angles to each other by the engine speed sensing means and by a linkage that actuates the main air throttle valve of the engine respectively,
   a cam-follower controlled by the cam and effective to apply variable loading to means sensitive to barometric pressure and to engine air-intake temperature,
   a liquid-powered servo mechanism including a piston for receiving the output of the liquid-pump and coupled to the pressure and temperature sensitive means,
   regulating means operable by the servo mechanism to control the fuel-per-cycle delivery of the fuel-injection pump, and
   modulating means effective in response to a given change of air-intake temperature or of barometric pressure to modulate that delivery to an extent proportional to its valve by a constant percentage, said modulating means further including a mechanical connection of variable velocity-ratio between a piston of the servo mechanism and the control means, the arrangement being such that, as between the conditions of maximum and minimum fuel-per-cycle delivery respectively, the velocity-ratio of the fuel-per-cycle regulating means and the servo piston is approximately in the ratio of 5 to 1, so that the modulation of the fuel-per-cycle delivery effected in response to a given change of air-intake temperature or barometric pressure is approximately five times as great at full load as at idling.

2. Control means according to claim 1, in which the mechanical connection of variable velocity-ratio comprises two eccentric sectors rotatably mounted on spindles of the servo mechanism and injection pump respectively, and interconnected by a flexible push-pull cable.

3. Means for controlling the fuel/air ratio of the combustible mixture in a spark-ignition internal combustion engine, served by a positive displacement variable-stroke liquid-fuel-injection pump that is driven by the engine at a constant speed-ratio, comprising:
   a positive displacement fixed-stroke liquid pump driven by the engine,
   engine-speed sensing means, a three-dimensional cam movable in paths at right angles to each other by the engine-speed sensing means and by a linkage that actuates the main air throttle valve of the engine respectively, a cam-follower controlled by the cam and effective to apply variable loading to means sensitive to barometric pressure and to engine air-intake temperature, a liquid-powered servo mechanism including a piston for receiving the output of the liquid-pump and coupled to the pressure and temperature sensitive means, said velocity-ratio as between movement of the piston of the servo mechanism and of the fuel-per-cycle regulating means of the pump being substantially constant, regulating means operable by the servo mechanism to control the fuel-per-cycle delivery of the fuel-injection pump, and modulating means effective in response to a given change of air-intake temperature or of barometric pressure to modulate that delivery to an extent proportional to its valve by a constant percentage, said modulating means including a spring of progressively increasing rate active upon the servo piston, the rate of this spring under idling conditions being approximately five times that obtaining under the full-load condition.

References Cited

UNITED STATES PATENTS

| | | | |
|---|---|---|---|
| 2,868,183 | 1/1959 | Reggio | 123—140.31 |
| 3,015,326 | 1/1962 | Wirsching et al. | 123—140.31 |
| 3,146,770 | 1/1964 | Garcia | 123—140.31 |

FOREIGN PATENTS

| | | |
|---|---|---|
| 811,904 | 4/1959 | Great Britain. |

MARK NEWMAN, *Primary Examiner.*

LAURENCE M. GOODRIDGE, *Assistant Examiner.*